(12) United States Patent
Koizumi

(10) Patent No.: US 6,191,818 B1
(45) Date of Patent: Feb. 20, 2001

(54) METHOD AND APPARATUS FOR GENERATING A PROJECTABLE SUBJECT VIEWFINDER

(75) Inventor: David H. Koizumi, Portland, OR (US)

(73) Assignee: Intel Corporation, Santa Clara, CA (US)

(*) Notice: Under 35 U.S.C. 154(b), the term of this patent shall be extended for 0 days.

(21) Appl. No.: 09/134,176

(22) Filed: Aug. 14, 1998

(51) Int. Cl.[7] .................................................. H04N 5/222

(52) U.S. Cl. .......................... 348/333; 348/207; 348/296

(58) Field of Search .................................. 348/207, 239, 348/220, 294, 296, 311, 312, 333, 334, 341, 335, 344, 370, 297, 15, 552, 722; 352/48, 142; 355/69; H04N 5/225

(56) References Cited

U.S. PATENT DOCUMENTS

| | | | |
|---|---|---|---|
| 2,816,475 | * 12/1957 | Waller et al. | ............................ 352/48 |
| 5,161,025 | 11/1992 | Nakao . | |
| 5,512,950 | * 4/1996 | Watanabe et al. | .................... 348/297 |
| 5,557,328 | 9/1996 | Ishihama et al. . | |
| 5,625,411 | * 4/1997 | Inuiya et al. | ........................... 348/220 |
| 5,712,684 | 1/1998 | Inoue et al. . | |
| 5,745,161 | * 4/1998 | Ito | ........................................... 348/15 |

* cited by examiner

Primary Examiner—Tuan Ho
(74) Attorney, Agent, or Firm—Blakely, Sokoloff, Taylor & Zafman LLP (57) ABSTRACT

A subject viewfinder unit includes a viewfinding unit. The viewfinding unit projects a frame target upon receiving a projection signal. A timing unit is coupled to the viewfinding unit. The timing unit generates the projection signal in response to information regarding a timing of when an image sensor of a camera is accumulating charge to form video fields.

29 Claims, 7 Drawing Sheets

METHOD AND APPARATUS FOR GENERATING A PROJECTABLE SUBJECT VIEWFINDER

FIELD OF THE INVENTION

The present invention relates to video cameras. More specifically, the present invention relates to viewfinders that are used by video camera operators to determine the field of view of a video camera.

BACKGROUND OF THE INVENTION

Viewfinders are optical or electronic devices that may be joined to a video camera to allow an operator of the video camera to perceive the scene filmed. Optical viewfinders typically include a framing lens and mask coordinated with the actual video camera lens. By looking through an eye piece, the operator can see a frame provided by the mask that indicates the field of view of the video camera. The more common electronic viewfinders typically include a small image video monitor that includes a mini-black and white or color tube/liquid crystal display (LCD) screen. The electronic viewfinders displays the actual scene filmed by the video camera. The electronic viewfinders may be built into the video camera and thus viewed through an eye piece or mounted externally to allow easier viewing.

The conventional video camera viewfinder has several drawbacks. Because the conventional viewfinder includes a lens or monitor that is attached to the camera, the operator is required to direct attention away from the actual subject when filming a subject that moves in order to insure that the subject is within the camera's field of view. This may be inconvenient in situations where the operator is filming an interview or meeting in which the operator is also a participant. When using a conventional viewfinder that is attached to the camera, the operator's face may also be partially obstructed from the filmed subject. This may be problematic when continuous, direct eye contact with the subject is desirable such as when the operator is filming a child or an animal.

SUMMARY

A subject viewfinder is disclosed. The subject viewfinder includes a viewfinding unit that projects a frame target upon receiving a projection signal. A timing unit is coupled to the viewfinding unit. The timing unit generates the projection signal in response to information regarding a timing of when an image sensor of a camera is accumulating charge to form video fields.

BRIEF DESCRIPTION OF THE DRAWINGS

The present invention is illustrated by way of example and not by way of limitation in the figures of the accompanying drawings, in which the like references indicate similar elements in and in which.

DETAILED DESCRIPTION

Figure 1:
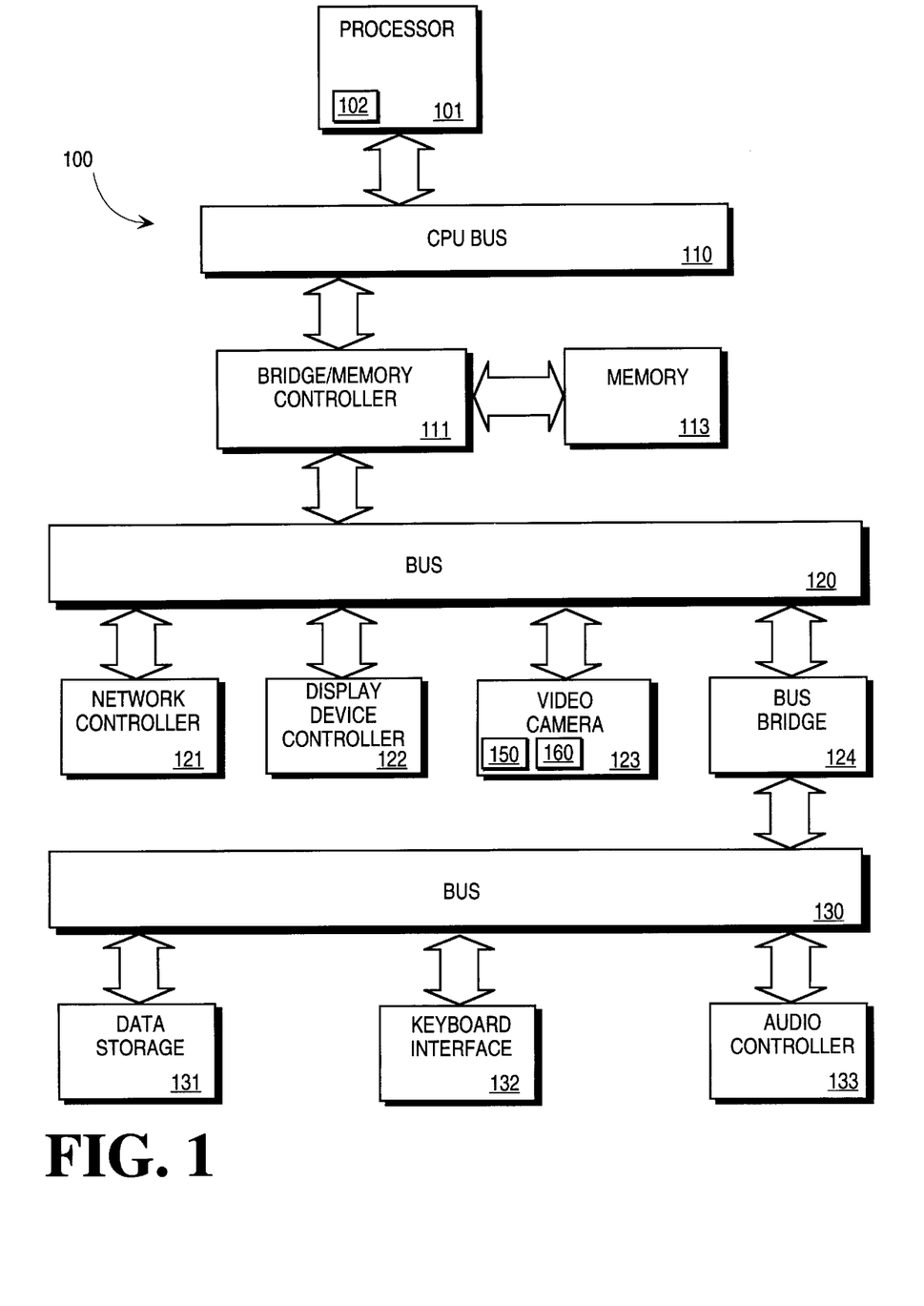
FIG. 1 is a block diagram of a computer system implementing an embodiment of the present invention.

Referring to FIG. 1, a computer system upon which an embodiment of the present invention can be implemented is shown as 100. The computer system 100 includes a processor 101 that processes data signals. The processor 101 may be a complex instruction set computer (CISC) microprocessor, a reduced instruction set computing (RISC) microprocessor, a very long instruction word (VLIW) microprocessor, a processor implementing a combination of instruction sets, or other processor device. FIG. 1 shows an example of the present invention implemented on a single processor computer system 100. However, it is understood that the present invention may be implemented in a computer system having multiple processors. The processor 101 is coupled to a CPU bus 110 that transmits data signals between processor 101 and other components in the computer system 100.

The computer system 100 includes a memory 113. The memory 113 may be a dynamic random access memory (DRAM) device, a static random access memory (S RAM) device, or other memory device. The memory 113 may store instructions and code represented by data signals that may be executed by the processor 101. A cache memory 102 resides inside processor 101 that stores data signals stored in memory 113. The cache 102 speeds up memory accesses by the processor 101 by taking advantage of its locality of access. In an alternate embodiment of the computer system 100, the cache 102 resides external to the processor 101.

A bridge memory controller 111 is coupled to the CPU bus 110 and the memory 113. The bridge memory controller 111 directs data signals between the processor 101, the memory 113, and other components in the computer system 100 and bridges the data signals between the CPU bus 110, the memory 113, and a first I/O bus 120.

The first I/O bus 120 may be a single bus or a combination of multiple buses. As an example, the first I/O bus 120 may comprise a Peripheral Component Interconnect (PCI) bus, a Personal Computer Memory Card International Association (PCMCIA) bus, a NuBus, or other buses. The first I/O bus 120 provides communication links between components in the computer system 100. A network controller 121 is coupled to the first I/O bus 120. The network controller 121 links the computer system 100 to a network of computers (not shown in FIG. 1) and supports communication among the machines. A display device controller 122 is coupled to the first I/O bus 120. The display device controller 122 allows coupling of a display device to the computer system 100 and acts as an interface between the display device and the computer system 100. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 101 through the display device controller 122 and displays the information and data signals to the user of the computer system 100.

A video camera 123 is coupled to the first I/O bus 120. The video camera 123 operates to capture an image of an object. The video camera 123 includes an image generating unit 150 that regulates an exposure level of an image sensor in the video camera 123 such that it generates image signals with a strength at a predetermined level for generating a high quality charge image. The image signals that form the charge image are translated into digital graphical data. The exposure level of the image sensor is regulated such that the amount of light entering the lens of the video camera 123 and the amount of time during which the incoming light forms a single video field is sufficient to generate a high quality charged image. In addition, the image generating unit 150 amplifies the exposure level of the image sensor when regulation of the amount of light entering the lens of the video camera 123 and the amount of time during which incoming light forms a single video field alone is not sufficient to generate a high quality charge image. The video camera also includes a subject viewfinder unit 160. The subject viewfinder unit 160 generates a projected target frame that operates as a viewfinder to allows an operator of the video camera 123 to determine the field of view of the video camera 123. The projected target frame allows the operator to determine the field of view of the video camera 123 without looking into a viewfinder attached to the video camera 123.

A second I/O bus 130 may be a single bus or a combination of multiple buses. As an example, the second 110 bus 130 may comprise a PCI bus, a PCMCIA bus, a NuBus, an Industry Standard Architecture (ISA) bus, or other buses. The second I/O bus 130 provides communication links between components in the computer system 100. A data storage device 131 is coupled to the second I/O bus 130. The data storage device 131 may be a hard disk drive, a floppy disk drive, a CD-ROM device, a flash memory device or other mass storage device. A keyboard interface 132 is coupled to the second I/O bus 130. The keyboard interface 132 may be a keyboard controller or other keyboard interface. The keyboard interface 132 may be a dedicated device or can reside in another device such as a bus controller or other controller. The keyboard interface 132 allows coupling of a keyboard to the computer system 100 and transmits data signals from a keyboard to the computer system 100. An audio controller 133 is coupled to the second I/O bus 130. The audio controller 133 operates to coordinate the recording and playing of sounds is also coupled to the I/O bus 130.

A bus bridge 124 couples the first I/O bus 120 to the second I/O bus 130. The bus bridge 124 operates to buffer and bridge data signals between the first I/O bus 120 and the second I/O bus 130.

Figure 2:
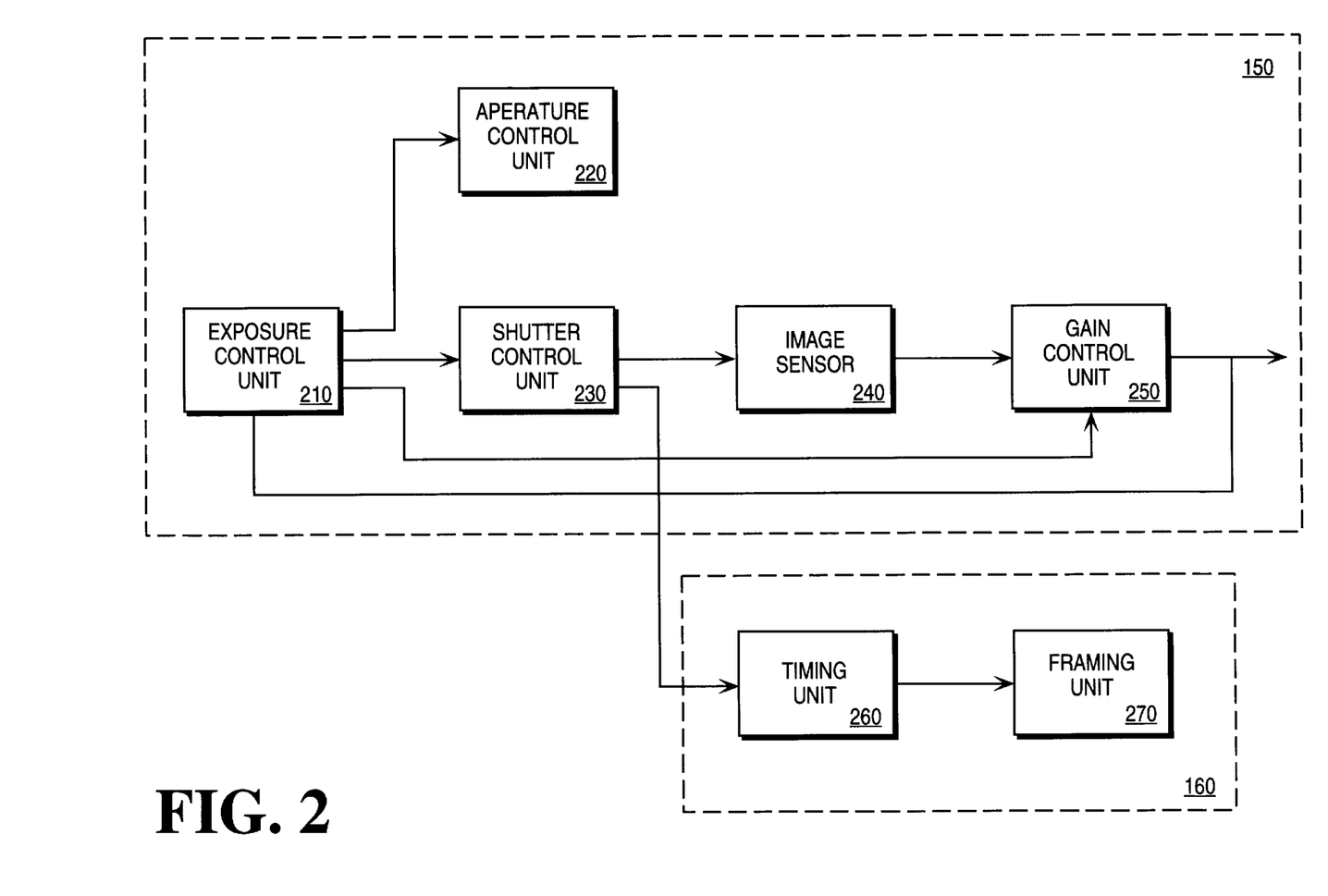
FIG. 2 is a block diagram of an image generating unit and a subject viewfinder unit in a video camera according to an embodiment of the present invention.

FIG. 2 illustrates an embodiment of an image generating unit 150 and the subject viewfinder unit 160 according to an embodiment of the present invention. The image generating unit 150 includes an exposure control unit 210. The exposure control unit 210 receives image signals generated by the video camera 123 and analyzes the image signals to determine whether it forms a high quality charge image. When the exposure control unit 210 determines that the image signals forms a charge image that is not high quality, it adjusts the exposure level of the image sensor 240 in order to improve the quality of the charge image.

An aperture control unit 220 is coupled to the exposure control unit 210. The aperture control unit 220 adjusts the size of the opening in lens' iris (not shown), to govern the amount of light admitted on the image sensor 240. When the lens is exposed to bright light, the exposure control unit 210 directs the aperture control unit 220 to adjust the lens' iris to a level that prevents the image sensor 240 from being over exposed. Conversely, when the lens is exposed to low light, the exposure control unit 210 directs the aperture control unit 220 to adjust the lens' iris to a level that prevents the image sensor 240 from being under exposed.

A shutter control unit 230 is coupled to the exposure control unit 210. The shutter control unit 230 adjusts the amount of time during which incoming light forms a single video field. Video is typically recorded at 60 fields per second in the National Television Standards Committee (NTSC) system and 50 fields per second in Phase Alternating Line (PAL) and System Electronique pour Couleur avec Memoire (SECAM) systems. The shutter control unit 230 controls exposure length by adjusting the amount of time during which the image sensor 240 is allowed to accumulate a charge before dumping it and starting another video field. A high shutter speed setting is used when sharper images are desired. To effectuate a higher shutter speed, the amount of time that the image sensor 240 is allowed to form a single video field is reduced. A low shutter speed setting is used to capture low light images. To effectuate a lower shutter speed, the amount of time that the image sensor 240 is allowed to form a single video field is increased.

The image sensor 240 is coupled to the shutter control unit 230. The image sensor 240 includes a plurality of light sensitive cells. An image for recording is projected via the lens onto the image sensor 240. The image projected onto the image sensor 240 charges the cells electrically. The brighter the incoming light, the more powerfully the cells are charged. The charged cells produce a charge image that includes a plurality of image signals that corresponds to light and color information of the recorded image. The exposure level of the image sensor 240 is required to be within a defined range in order for it to produce image signals at a strength that forms a high quality charge image. When the exposure level is outside of the defined range, the recorded image may appear to be too dark or too bright. Proper exposure depends both on the amount of light entering the lens and the amount of time during which the incoming light forms a single video field. The image sensor 240 accumulates a charge when receiving an imaging sensing signal from the shutter control unit 230. The shutter control unit 230 controls exposure length of the image sensor 240 by adjusting the amount of time during which the image sensor 240 is allowed to accumulate a charge before dumping it and starting another video field. The image sensor 240 may be implemented using charge coupled devices (CCD), CMOS sensors, or other sensing device.

A gain control unit 250 is coupled to the image sensor 240 and the exposure control unit 210. The gain control unit 250 receives the image signals from the image sensor 240 and amplifies selected image signals according to a gain profile in response to the exposure control unit 210. The gain control unit 250 sends the amplified image signals to the exposure control unit 210 to be analyzed. The gain profile includes information that identifies the selected image signals and levels of amplification to amplify the selected signals. The gain profile may be selected from a plurality of pre-constructed gain profiles or generated from scratch by a user of the video camera 123.

A subject viewfinder unit 160 is coupled to the shutter control unit 230. The subject viewfinder unit 160 includes a timing unit 260. The timing unit 260 receives information regarding a timing of when the image sensor 240 is accumulating charge to form video fields including the image sensing signal from the shutter control unit 230. The timing unit 260 generates a projection signal during periods of time when the image sensor 240 is not accumulating charge to form video fields.

The subject viewfinder unit 160 includes a framing unit 270 that is coupled to the timing unit 260. The framing unit 270 projects a frame target in response to receiving the projection signal from the timing unit 260. The frame target is projected during periods of time when the image sensor 240 is not accumulating charge to form video fields such that the frame target is not captured by the image sensor 240.

It should be appreciated that the aperture control unit 220, the shutter control unit 230, and the gain control unit 250 may be controlled manually in addition to being controlled by the exposure control unit 210. The image generating unit 150 may be implemented with or without the aperture control unit 220 and the gain control unit 250. It should also be appreciated that the exposure control unit 210, the aperture control unit 220, the shutter control unit 230, the image sensor 240, the gain control unit 250, and the subject viewfinder unit 160 may be implemented using any known circuitry or technique.

Figure 3:
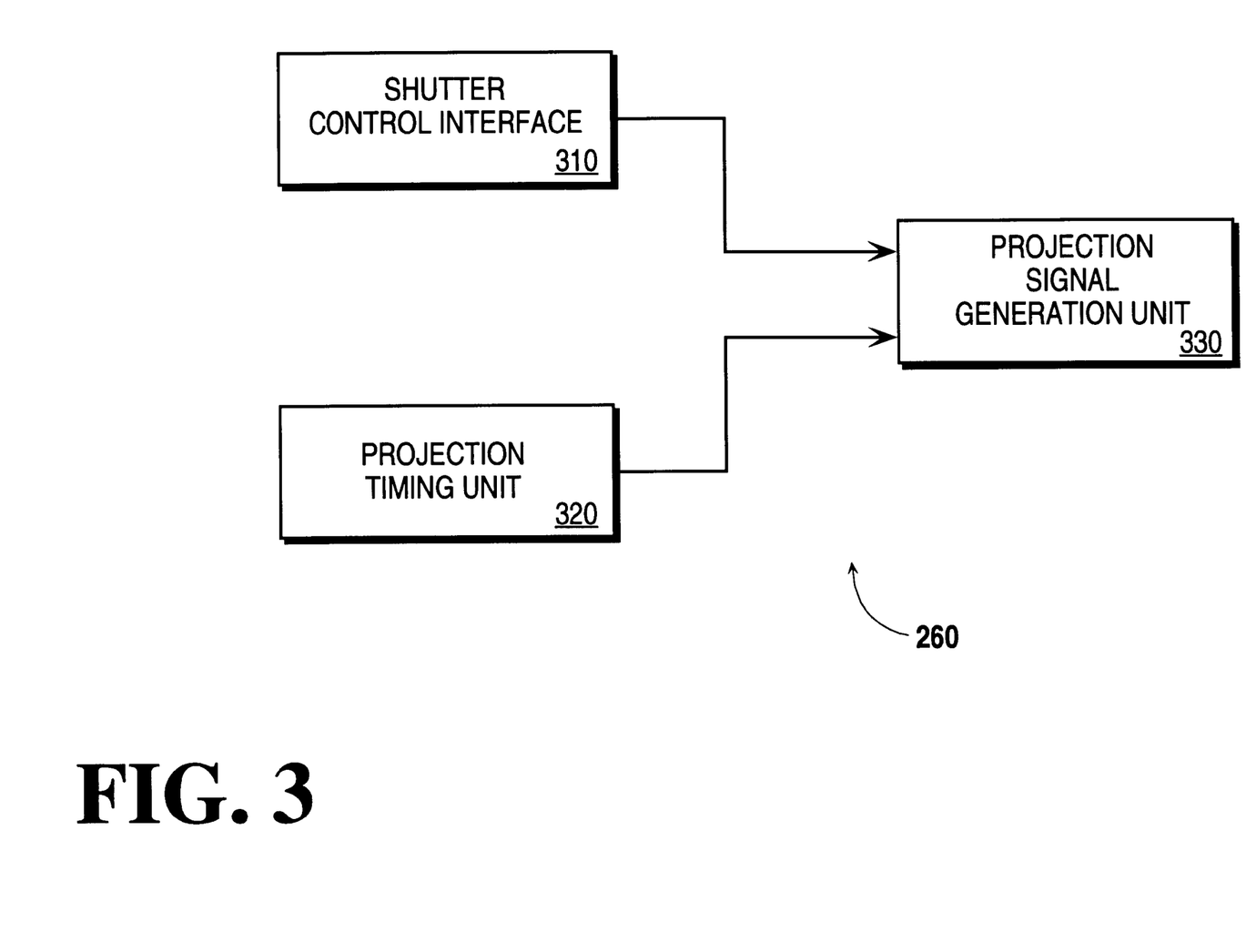
FIG. 3 is a block diagram of a subject viewfinder unit according to an embodiment of the present invention.

FIG. 3 is a block diagram of a timing unit 260 according to an embodiment of the present invention. The timing unit 260 includes a shutter control interface 310. The shutter control interface 310 interfaces with the shutter control unit 230 (shown in FIG. 2) of the image generating unit 260 (shown in FIG. 2) to obtain information regarding a timing of when the image sensor 240 (shown in FIG. 2) is accumulating charge to form video fields. The information may be, for example, rate and duration information of the image sensing signal generated by the shutter control unit 230 or the actual image sensing signal sent to the image sensor 240.

The timing unit includes a projection timing unit 320. The projection timing unit 320 is programmable to effectuate a frequency of projection of the frame target from the framing unit 270 (shown in FIG. 2). According to an embodiment of the timing unit 260, the frequency of projection of the frame target may be programmed on a per second or a per minute basis.

A projection signal generation unit 330 is coupled to the shutter control interface 310 and the projection timing unit 320. The projection signal generation unit 330 determines an interval to generate projection signals based on the information received from the shutter control interface 310 and the desired frequency of projection from the projection timing unit 320. The projection signal generation unit 330 generates projection signals during periods of time when the image sensor 240 is not accumulating charge to form video fields.

Figure 4:
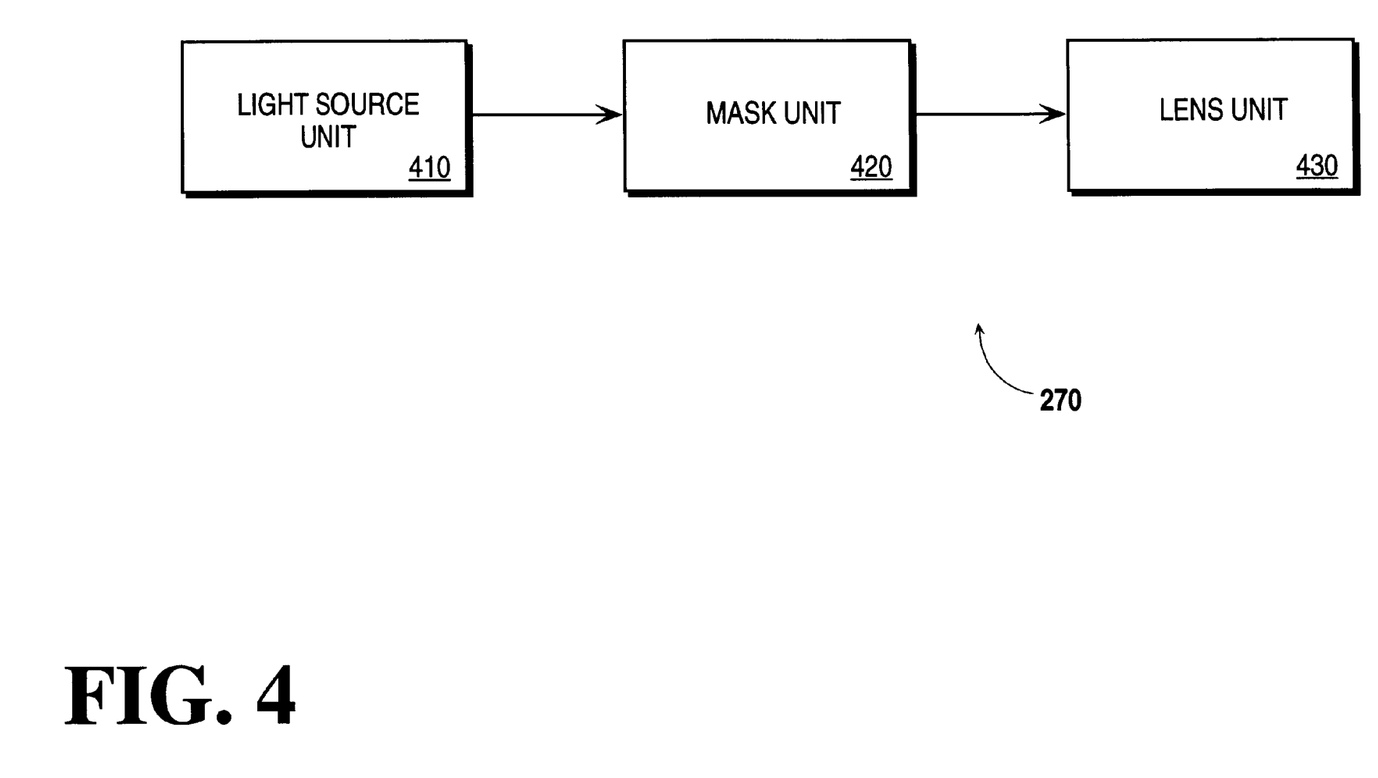
FIG. 4 is a block diagram of a timing unit according to an embodiment of the present invention.

FIG. 4 is a block diagram of a framing unit 270 according to an embodiment of the present invention. The framing unit includes a light source unit 410. The light source unit 410 generates a pulsed, short duration light in response to receiving a projection signal from the timing unit 260 (shown in FIG. 3). The light source unit 410 may be implemented by a xenon strobe unit, a high intensity light emitting diode (LED), or other light source.

The framing unit 270 also includes a mask unit 420. The mask unit 420 is coupled to the light source unit 410. The mask unit 420 may include interchangeable slides that may have different types of frame target images. The frame target images may include a cross-hair frame image, a bracket frame image, or other frame target images. Light generated from the light source unit 410 shines on the mask unit 420 and directs the frame target image towards the lens unit 430.

The lens unit 430 is coupled to the mask unit 420. The lens unit 430 includes a framing lens (not shown) that is coordinated with the video camera lens (not shown) such that the field of view of both lenses are the same. The lens unit 430 projects the frame target image originating from the mask unit 420 through the framing lens such that frame target appears on a subject in the field of view of the video camera lens. It should be appreciated that the framing lens may be coordinated with any type of video camera lens such that the field of view of both lenses are the same. For example, if the video camera lens is a zoom lens, the framing lens may also be a zoom lens that is programmable to follow the focusing direction of the video camera lens.

The subject viewfinder unit 160 (shown in FIG. 1) projects a pulsed, short duration frame target image which corresponds to the field of view of the video camera 123. The projected frame target image is produced in short pulses of high intensity light which are timed such that the projections are not captured by the image sensor 240 of the video camera 123. The operator of the video camera 123 and bystanders, however, will be able to see the video camera's field of view projected onto the subject being filmed by the video camera 123.

The subject viewfinder unit 160 allows the operator of the video camera 123 to be able to film a subject while maintaining continuous, direct eye contact. The operator is unencumbered by the need to monitor a LCD screen or look through an optical viewfinder. The subject viewfinder unit 160 allows video cameras manufacturers to manufacture video cameras without expensive electronic viewfinders.

Figure 5:
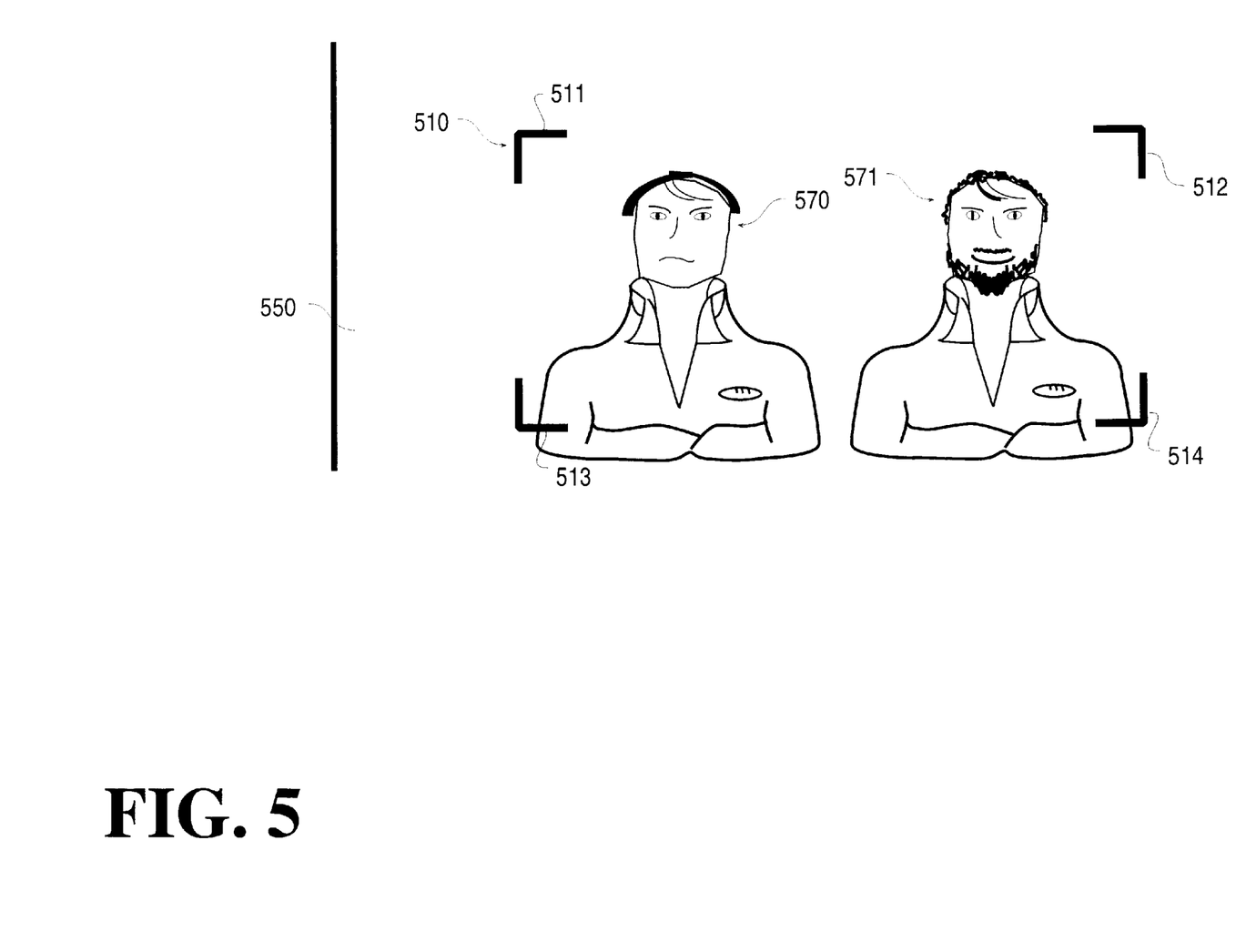
FIG. 5 illustrates a projected frame according to an embodiment of the present invention.

FIG. 5 illustrates a projected frame target 510 according to an embodiment of the present invention. The frame target 510 is a bracket frame image that is projected from the subject viewfinder unit 160 (shown in FIG. 2) onto the subject that is in the field of view of the video camera 123 (shown in FIG. 1). An upper left bracket 511 of the frame target 510 is projected onto a wall 550 behind a first person 570. The upper left bracket 511 frames the upper left region of the field of view of the video camera 123. An upper right bracket 512 of the frame target 510 is projected onto a wall behind a second person 571. The upper right bracket 512 frames the upper right region of the field of view of the video camera 123. A lower left bracket 513 of the frame target 510 is projected onto the body of the first person 570. The lower left bracket 513 frames the lower left region of the field of view of the video camera 123. A lower right bracket 514 of the frame target 510 is projected onto the body of the second person 571. The lower right bracket 514 frames the lower right region of the field of view of the video camera 123.

Figure 6:
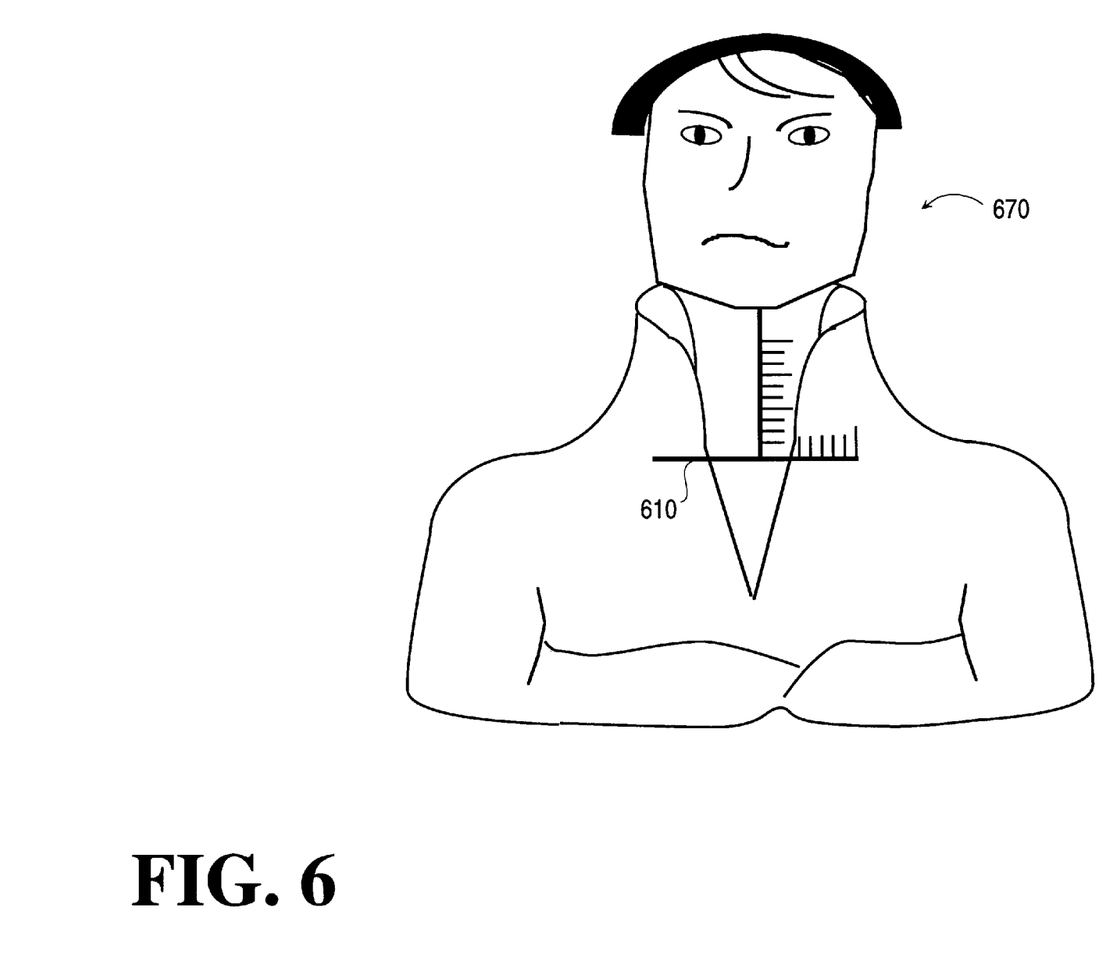
FIG. 6 illustrates a projected frame according to a second embodiment of the present invention.

FIG. 6 illustrates a projected frame target 610 according to a second embodiment of the present invention. The frame target 610 is a cross-hair image that is projected from the subject viewfinder unit 160 (shown in FIG. 2) onto the subject that is in the field of view of the video camera 123 (shown in FIG. 1). The frame target 610 is projected on the body of a person 670 in the field of view of the video camera 123.

Figure 7:
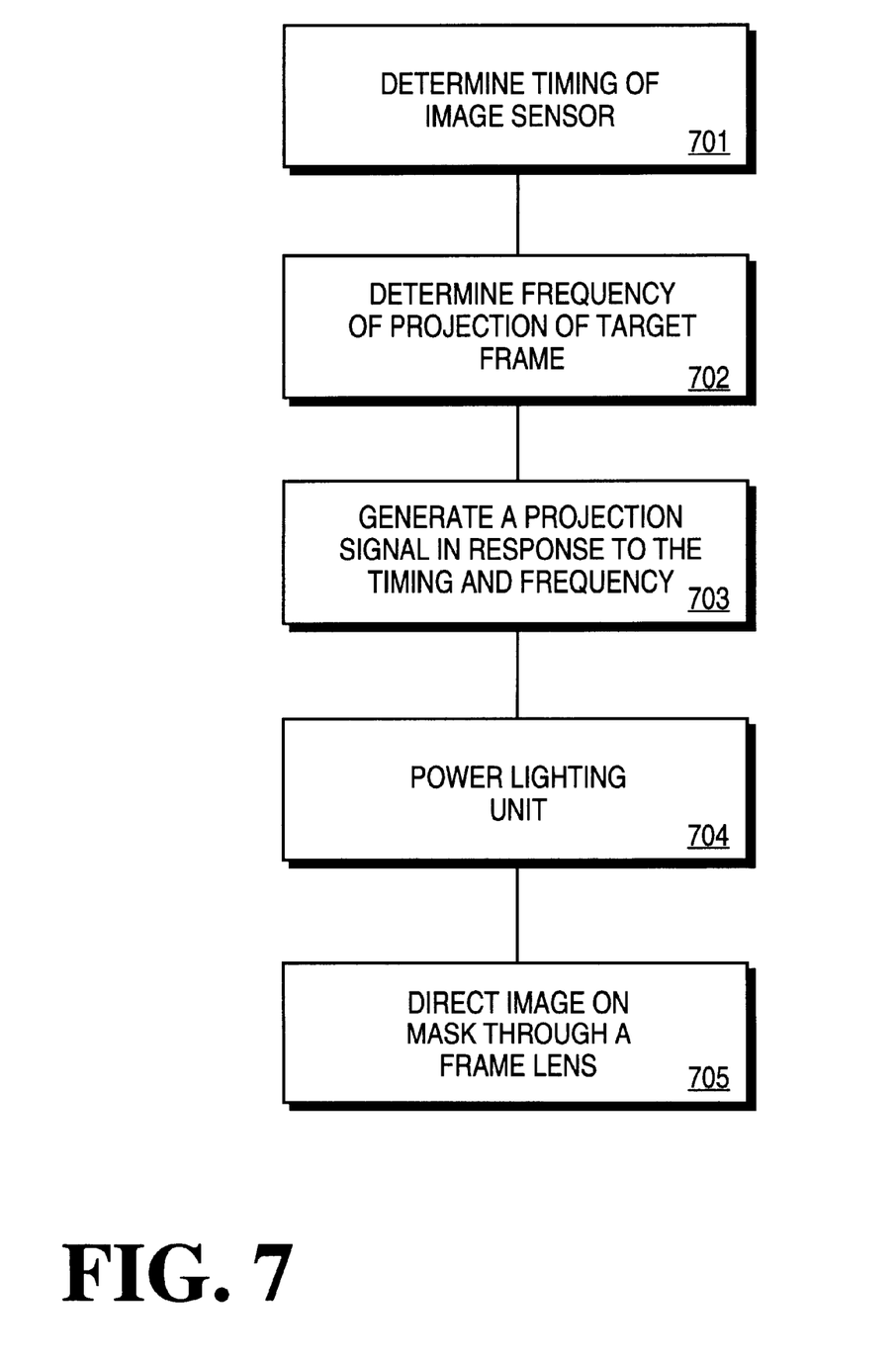
FIG. 7 is a flow chart that illustrates a method for generating a projected viewfinder according to an embodiment of the present invention.

FIG. 7 is a flow chart that illustrates a method for generating a projected viewfinder according to an embodiment of the present invention. At step 701, a timing of when an image sensor in a camera is allowed to accumulate charge to form a video field is determined. According to an embodiment of the present invention, determining the timing of when the image sensor in the camera is allowed to accumulate charge to form a video field is achieved by obtaining timing information from a shutter control unit of the camera.

At step 702, a frequency of projection of a target frame is determined. According to an embodiment of the present invention, the frequency of projection may be programmed by an operator of the camera.

At step 703, a projection signal is generated in response to the timing and the frequency of projection such that the projection signal is generated when the image sensor is not forming a video field.

At step 704, a light source unit is powered in response to the projection signal.

At step 705, an image on a mask is directed through a frame lens and projected to a subject in the field of view of the camera.

In the foregoing description, the invention is described with reference to specific exemplary embodiments thereof. It will, however, be evident that various modifications and changes may be made thereto without departing from the broader spirit and scope of the present invention as set forth in the appended claims. The specification and drawings are to be regarded in an illustrative rather than a restrictive sense.

What is claimed is:

1. A subject viewfinder unit, comprising:

a viewfinding unit to project a frame target upon receiving a projection signal;

a timing unit, coupled to the viewfinding unit, to generate the projection signal in response to information regarding a timing of when an image sensor of a camera is accumulating charge to form video fields, wherein the timing unit includes a projection timing unit that is programmable to effectuate a frequency of projection of the frame target.

2. The subject viewfinder of claim 1, wherein the timing unit further comprises:

a shutter control interface, coupled to a shutter control unit, to receive the information regarding the timing of when the image sensor is accumulating the charge to form the video fields; and a signal generation unit to generate the projection signal in response to the timing information and the frequency.

3. The subject viewfinder of claim 1, wherein the viewfinding unit comprises:

a light source unit that generates light upon receiving the projection signal;

a mask unit, coupled to the light source unit, that includes a frame target image; and a lens unit, coupled to the m ask unit, that projects the frame target image.

4. The subject viewfinder of claim 3, wherein the light source unit includes a xenon strobe light.

5. The subject view finder of claim 3, wherein the light source unit includes a high intensity light emitting diode.

6. The subject viewfinder of claim 3, wherein the mask unit includes a bracket frame target image.

7. The subject viewfinder of claim 3, wherein the mask unit includes a cross-hair frame target image.

8. The subject viewfinder of claim 3, wherein the lens unit includes:

a zoom lens; and a lens focusing mechanism that adjusts the zoom lens in response to focusing signals.

9. A computer system, comprising:

a bus;

a processor coupled to the bus;

a video camera, coupled to the bus, that includes a subject viewfinder unit to generate a projected target frame that operates as a viewfinder to allow an operator to determine the field of view of the video camera, wherein the subject viewfinder unit includes a viewfinding unit to project a frame target upon receiving a projection signal and a timing unit, coupled to the viewfinding unit, to generate the projection signal in response to information regarding a timing of when an image sensor of the video camera is accumulating charge to form video fields, wherein the timing unit includes a projection timing unit that is programmable to effectuate a frequency of projection of the frame target.

10. The computer system of claim 9, wherein the timing unit further comprises:

a shutter control interface, coupled to a shutter control unit, to receive the information regarding the timing of when the image sensor is accumulating the charge to form the video fields; and a signal generation unit to generate the projection signal in response to the timing information and the frequency.

11. The computer system of claim 9, wherein the viewfinding unit further comprises:

a light source unit to generate light upon receiving the projection signal;

a mask unit, coupled to the light source unit, to include a frame target image; and a lens unit, coupled to the mask unit, to project the frame target image.

12. A method for generating a subject viewfinder, comprising:

determining a timing of when an image sensor in a camera is allowed to accumulate charge to form a video field;

generating a projection signal in response to the timing such that the projection signal is generated when the image sensor is not forming a video field, wherein the projection signal is generated in response to the timing and a determined frequency of projection of the frame target; and projecting a frame target in response to the projection signal.

13. The method of claim 12, wherein determining the timing of when the image sensor in the camera is allowed to accumulate charge to form a video field comprises receiving timing information from a shutter control unit of the camera.

14. The method of claim 12, wherein projecting the frame target comprises:

powering a light source directed on a mask with an image of a subject viewfinder;

focusing a framing lens to coordinate its field of view with a field of view of the camera; and directing the image of the frame target through the framing lens.

15. A subject viewfinder, comprising:

a viewfinding unit, to project a frame target upon receiving a projection signal, wherein the viewfinding unit includes a light source unit to generate light upon receiving the projection signal, a mask unit, coupled to the light source unit, to define a frame target image, and a lens unit, coupled to the mask unit, to project the frame target image; and a timing unit, coupled to the viewfinding unit to define a frame target image, to generate the projection signal in response to information regarding a timing of when an image sensor of a camera is accumulating charge to form video fields.

16. The subject viewfinder of claim 15, wherein the light source unit includes a xenon strobe light.

17. The subject viewfinder of claim 15, wherein the light source unit includes a high intensity light emitting diode. —

18. The subject viewfinder of claim 15, wherein the mask unit includes a bracket frame target image.

19. The subject viewfinder of claim 15, wherein the mask unit defines a cross-hair frame target image.

20. The subject viewfinder of claim 15, wherein the lens unit includes a zoom lens and a lens focusing mechanism that adjusts the zoom lens in response to focusing signals.

21. A computer system, comprising:

a bus;

a processor coupled to the bus;

a video camera, coupled to the bus, that includes a subject viewfinder unit to generate a projected target frame that operates as a viewfinder to allow an operator to determine the field of view of the video camera, wherein the subject viewfinder unit includes a viewfinding unit to project a frame target upon receiving a projection signal, that includes a light source unit to generate light upon receiving a projection signal, a mask unit, coupled to the light source unit, that includes a frame target image, and a lens unit, coupled to the mask unit, to project the frame target image, and a timing unit, coupled to the viewfinding unit, to generate the projection signal in response to information regarding a timing of when an image sensor of the video camera is accumulating charge to form video fields.

22. The computer system of claim 21, wherein the timing unit comprises:

a shutter control interface, coupled to a shutter control unit, that receives the information regarding the timing of when the image sensor is accumulating the charge to form the video fields;

a projection timing unit that is programmable to effectuate a frequency of projection of the frame target; and a signal generation unit to generate the projection signal in response to the timing information and the frequency.

23. The computer system of claim 21, wherein the light source unit includes a xenon strobe light.

24. The computer system of claim 21, wherein the light source unit includes a high intensity light emitting diode.

25. The computer system of claim 21, wherein the mask unit includes a bracket frame target image.

26. The computer system of claim 21, wherein the mask unit includes a cross-hair frame target image.

27. The computer system of claim 21, wherein the lens unit includes a zoom lens and a lens focusing mechanism that adjusts the zoom lens in response to focusing signals.

28. A method, comprising:

determining a timing of when an image sensor in a camera is allowed to accumulate charge to form a video field;

generating a projection signal in response to the timing such that the projection signal is generated when the image sensor is not forming a video; and projecting a frame target in response to the projection signal, including powering a light source directed on a mask with an image of a subject viewfinder, focusing a framing lens to coordinate its field of view with a field of view of the camera, and directing the image of the frame target through the framing lens.

29. The method of claim 28, wherein the projection signal is generated in response to the timing and a determined frequency of projection of the frame target.

* * * * *